No. 851,049. PATENTED APR. 23, 1907.
H. A. W. WOOD.
METHOD OF AND MEANS FOR PREPARING AND HOLDING ELECTROTYPE PLATES.
APPLICATION FILED JAN. 7, 1893. RENEWED AUG. 14, 1905.

3 SHEETS—SHEET 1.

Witnesses
Chas. F. Schmelz
E. M. Healy

Inventor
H. A. W. Wood,
By his Attorney
Louis W. Southgate

No. 851,049. PATENTED APR. 23, 1907.
H. A. W. WOOD.
METHOD OF AND MEANS FOR PREPARING AND HOLDING ELECTROTYPE PLATES.
APPLICATION FILED JAN. 7, 1893. RENEWED AUG. 14, 1905.
3 SHEETS—SHEET 2.
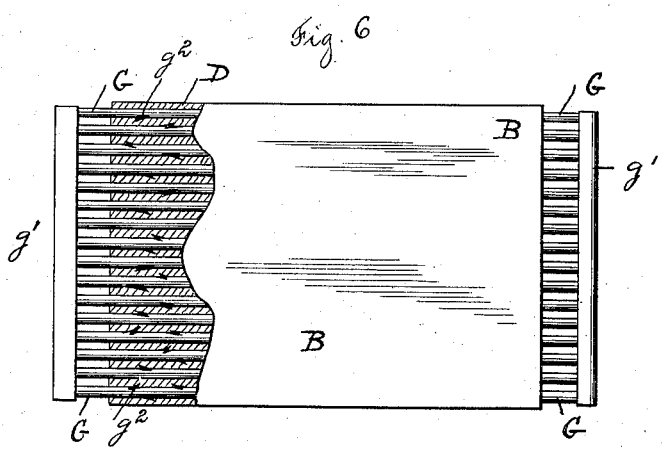
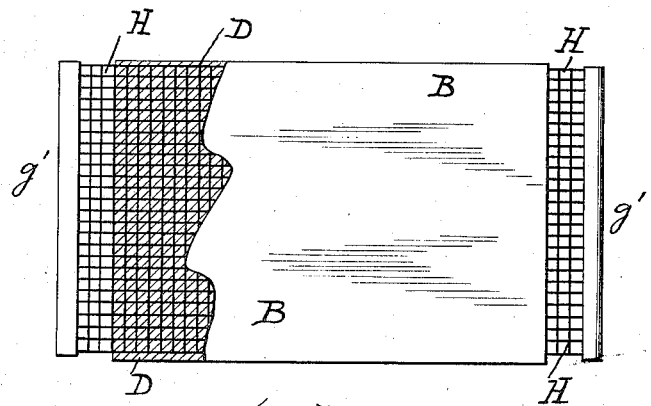

No. 851,049. PATENTED APR. 23, 1907.
H. A. W. WOOD.
METHOD OF AND MEANS FOR PREPARING AND HOLDING ELECTROTYPE PLATES.
APPLICATION FILED JAN. 7, 1893. RENEWED AUG. 14, 1905.
3 SHEETS—SHEET 3.
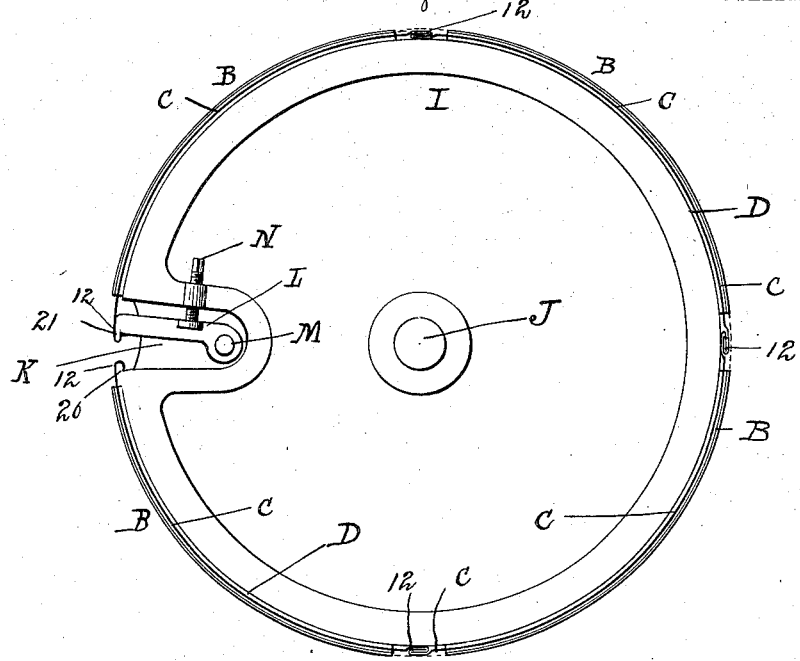
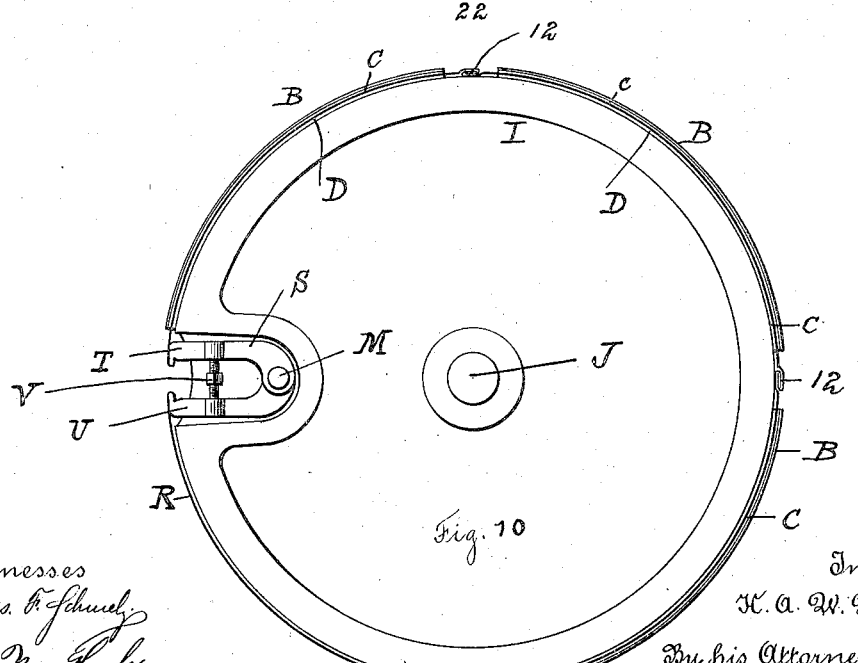
Witnesses
Chas. F. Schuely
E. M. Healy
Inventor
H. A. W. Wood,
By his Attorney
Louis W. Southgate

UNITED STATES PATENT OFFICE.

HENRY A. WISE WOOD, OF NEW YORK, N. Y., ASSIGNOR TO THE CAMPBELL PRINTING PRESS & MANUFACTURING COMPANY, OF NEW YORK, N. Y., A CORPORATION OF NEW YORK.

METHOD OF AND MEANS FOR PREPARING AND HOLDING ELECTROTYPE-PLATES.

No. 851,049.            Specification of Letters Patent.            Patented April 23, 1907.

Application filed January 7, 1893. Renewed August 14, 1906. Serial No. 274,241.

*To all whom it may concern:*

Be it known that I, HENRY A. WISE WOOD, a citizen of the United States, residing at New York, in the county of New York and State of New York, have invented a new and useful Improvement in Methods of and Means for Preparing and Holding Electrotype-Plates, of which the following is a specification.

The aim of this invention is to provide a new and improved method of and means for preparing and holding electrotype-plates, so that they may be practically adapted for printing-surfaces, either with flat or curved printing-surface-holding members; and to this end the invention consists of the method, devices, and improvements described and claimed in this specification, and illustrated in the accompanying three sheets of drawings, in which—

Figure 1:
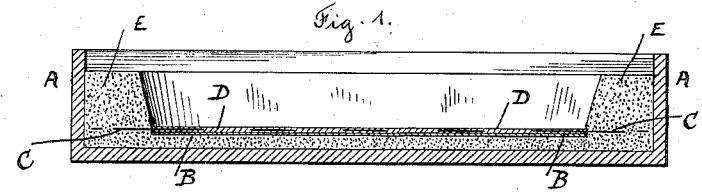
Figure 2:
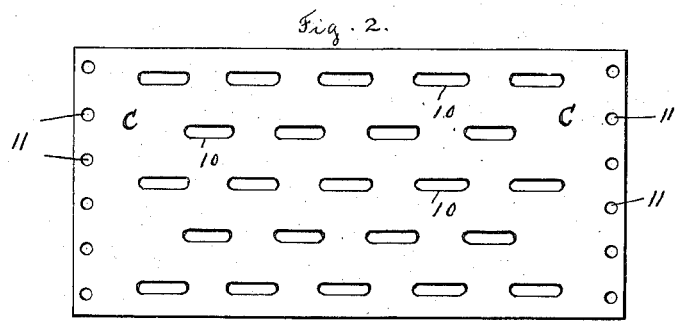
Figure 3:
Figure 4:
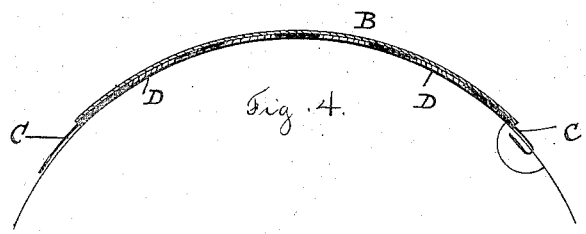
Figure 5:
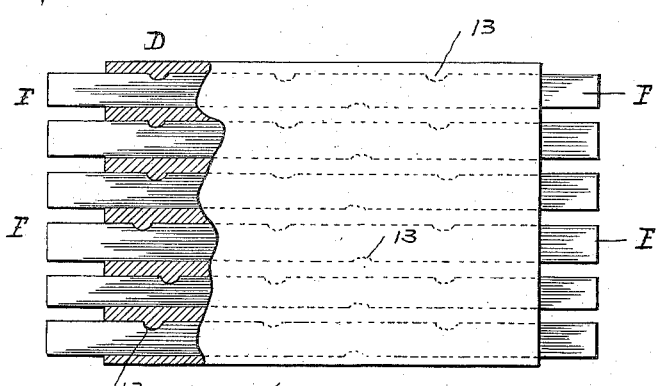

Figure 1 is a view of a backing-trough, showing the way in which the plates are prepared. Fig. 2 is a view of the strip which is formed with the plate. Fig. 3 is a sectional elevation of the complete plate. Fig. 4 is a similar view illustrating the plate bent so that the same may be applied to a curved printing member. Fig. 5 is a modification showing a different form of tension-strip. Figs. 6 and 7 are further modifications, and Figs. 8, 9, and 10 illustrate the way in which electrotype-plates prepared after my method may be applied to curved printing-surfaces or to printing-cylinders.

The way electrotype-plates are made and prepared for printing is as follows: The type or cuts from which it is desired to print are set up in the usual manner. From the type or cuts a wax impression is taken. This wax impression is then coated with graphite or some other similar conductor of electricity, and the wax is then copper-plated by the usual electrotype-plating apparatus. The wax is then melted away from the copper plate, and the copper shell thus formed constitutes the printing-surface. This copper plate is very delicate and thin and could not of itself be manipulated or used to print without some suitable backing or clamping means. The usual way of backing these copper shells is to tin or otherwise suitably prepare the back of the same, and then to cast on the plate a suitable backing, which may be made out of type or stereotype metal. This way of preparing electrotype-plates is well known and is often practiced.

It is well known in the art that the present methods adapting electrotype-plates to use upon rotary presses in which are curved-plate cylinders are very crude and unsatisfactory and that it is impossible to produce the same result from the curved plates now used that is obtainable from a duplicate plate made flat.

The object of this my present invention is to so construct an electrotype-plate and to so manipulate the same that the now existing difficulties will be overcome and the prejudice to the use of curved electrotype-plates removed.

It is unnecessary to dwell upon the fact that the curved printing-surface of a rotary press offers infinitely greater speed than is possible upon any known form of flat printing-surface press.

The difficulties that are encountered in using the ordinary electrotype-plate as a printing-surface may be classified as follows:

First. There is no practicable method now in use by which an electrotype-plate may be bent to fit a curved printing member without placing its printing-surface under pressure, whereby the surface will be marred or disfigured, and whereby the plate will stretch in the bending operation so that the printing-surface will be distorted, and the plate will be longer one way than the form from which it was made.

Second. Electrotype-plates as now made and adapted to curved surfaces are incapable of being unbent and adapted to flat surfaces without great injury to the printing-surface. An electrotype-plate which has been curved cannot thereafter be used except on a cylinder under the present practice. Further, electrotype-plates under the present practice if used on flat printing-presses have their margins removed. If a plate having its margin removed, and thereby adapted for flat printing, should be bent, the outer edges of the printing-surfaces would be spoiled, for the bending process necessarily will tear or distort the edge of the type-plate which was left exposed by the removal of the margins.

Therefore plates which under the ordinary practice have been once adapted for flat-bed presses are of no practical use in connection with rotary or curved-plate-surface presses, and vice versa.

Third. Electrotype-plates as now constructed are secured on their cylinders by edge-compressing clamps. Thus after a time the plates become "rolled out" or stretch, and the plates "buckle" and lose their curvature.

Fourth. Electrotype-plates as now adapted to curved surfaces are of necessity thick and are therefore not sensitive to the process of underlaying, and thereby much of their value as to the printing of illustrations is lost.

Fifth. Electrotype-plates as now constructed are incapable of singly occupying more than one-half of the circumference of their supporting-cylinders. Therefore it is impossible, no matter how desirable it may be, to print from an electrotype with a rotary press a continuous design of greater length than half the said circumference.

My method consists, preferably, of interposing a straining or tension strip, which may be made in various forms, as hereafter described, in the mold in which the copper plate is backed, so that as the backing metal is cast onto the copper plate the straining or tension strip or strips will be formed or made to constitute a part of the finished plate. Further, in backing the plate I use a very small quantity of the backing metal, so that the plate will be very thin—say, one-sixteenth of an inch in thickness altogether—so that the plate will be flexible and can be flexed, preferably by hand. The plate can be then finished in the usual manner and the strip used to tightly hold the same to the printing-base. I preferably use for this straining or tension strip a strong steel flexible strip, and this strip is preferably perforated, so that the metal can unite through the same, whereby the strip will be most strongly embedded in the printing-plate. Thus it will be seen that my complete plate consists of the copper shell and a backing which is composed of two or more materials, one of which, as the strip, will prevent the plate from stretching or warping as the same is manipulated, as the steel strip itself cannot and will not stretch.

A plate constructed by my method overcomes the first of the above difficulties, as the plate being so thin and having a flexible strip embedded therein may be bent by hand to fit the curved surface, and having only a slight backing the printing or copper surface will not be strained by the bending operation.

The second objection is overcome by reason that I may use the steel strip both to fasten the electrotype-plate to a curved printing member or to a flat printing member, and if the plate is fastened first to a curved printing member the same can afterward be easily unbent and fastened to a flat printing member, and vice versa.

The third objection or difficulty before noted is overcome by reason of the fact that a plate made after my method can be secured in place by end strain.

The fourth difficulty before noted is overcome by reason of the fact that the plate made by my method is very thin and will therefore be sensitive to underlaying.

The fifth difficulty before noted is overcome by reason of the fact that an electrotype-plate may be made by my method of sufficient length and be wrapped entirely around the periphery of a printing-cylinder, whereby a continuous design can be printed by a printing-cylinder; and this is very useful in some classes of work—as, for example, in map work.

Thus plates prepared by my method can be bent by hand to fit curved printing members, can be unbent by hand, can be secured by end strain on the printing members, are sensitive to the process of underlaying, can be adapted both for use upon curved or flat printing members, and can be wrapped entirely around a printing-cylinder. These advantages render a plate prepared after my method very useful in establishments where there are flat-bed and rotary presses, on which it is desired to use plates interchangeably and where it is desired to nicely hold the plate on a curved printing member, and where it is desired to obtain nice printing, as by the process of underlaying, and where it is desired to print a continuous design.

Referring now to the drawings, my method will be first described.

In Fig. 1, A represents the usual backing-trough, and in this trough the copper plate B prepared in the manner before described is laid with the type-face down, as shown. Then the steel strip C is arranged above the same and securely held. This strip C is preferably arranged a slight distance above the copper plate B, so that the backing metal can adhere to the entire surface of the copper plate. This strip C has suitable holes 10 formed therein so that the metal can unite through the same. With a mold prepared in this manner backing metal, as D, is poured in on top of the strip C. This backing metal D will flow through the holes 10 of the strip C and will unite to the copper plate B and the steel strip C will be strongly embedded in the backing metal. The complete plate is then removed from the mold and is finished and dressed in any of the usual manners. One convenient way for supporting the metal strip above the copper plate is to simply embed the ends of the same in the sand E of the mold, as shown. The strip C may have holes, as 11, in the ends thereof, whereby the whole plate can be securely strained in place on the printing member, or the ends of the strips may be bent, as at 12, to form a hook by which the same can be secured in place. The plate prepared in this manner is preferably made thin enough so that the same can be bent by hand to fit a curved surface, although, broadly speaking, it is not necessary, so far as the scope of my invention is concerned, to make the plate any thinner than in the common practice.

In Fig. 3 the plate is shown flat as adapted for flat printing, and in Fig. 4 the plate is shown as bent to fit the periphery of a curved printing member.

Instead of using one steel strip C, I may use a number of steel strips, as F, and these strips F, instead of having holes through the same may have notches 13 formed in the sides thereof, as shown in Fig. 5. These strips F constitute the straining-strip and are included where I hereafter use the word "strip." Again, instead of these steel strips I may use flexible wires, as G, as shown in Fig. 6, and this plurality of wires constitutes a "strip," as I use the word. These flexible wires G may be united at their ends, if desired, to suitable pieces $g'$, which may be used for the purpose of clamping the plate in place, and, if desired, the wires G may have small notches or projections $g^2$, whereby they will stay in place in the plate.

In Fig. 7 instead of using wires I have used a strip of strong wire-netting, as H, and on the ends of this wire-netting I have arranged similar pieces $g'$, as in the previous device. These strips, wires or netting, as the case may be, would be set in the printing-plate by the method before described.

Plates prepared in this manner can be very easily and readily applied to printing-supports, and the way in which the printing-plates could be applied to curved printing-supports is shown in the third sheet of the drawings.

In Fig. 8 the steel strips C are shown as having the bends 12, before referred to, and these bends 12 are arranged so that the same may interlock, as shown. I represents the printing-cylinder to which the plates are to be applied, and this cylinder I may be mounted upon a suitable shaft J, as shown. This cylinder I has a suitable recess K formed therein, and arranged in this recess K is a clamping device, which consists of a pivoted jaw L, mounted upon a shaft M, and this jaw may be moved by screws N to strain the plates to the cylinder. This jaw has a projection 21, which is adapted to catch into the end of one of the strips, as shown, and on the other end of the recess is formed a similar projection 20, which is also arranged to catch into one of the bent ends of the steel strips.

Instead of using interlocking ends the strips could have holes, as before described, in one end thereof, and rivets or clasps could be arranged to interlock into these holes, as shown at 22 in Fig. 9.

In Fig. 10 I have shown a device arranged substantially as in Fig. 9, except that the periphery of the cylinder is not entirely covered with printing-plates and that a blank strip R is arranged to interlock with the end of the last plate and to engage the clamping device, so that the printing-cylinder will not be entirely covered with printing-plates. A plurality of these blank strips may be used and disposed on the printing-surface of the cylinder as desired. The particular clamping device used in this Fig. 11 consists of two jaws S and U, similar to the jaw L of the previous device, but which jaws are oppositely moved by right and left hand screws V, as shown. Thus it will be seen that electrotype-plates prepared after my method can be secured to printing-surfaces by end strain. The printing-plates would be secured in substantially the same manner to flat printing-surfaces.

If desired, a plate could be prepared after my method so that the same would entirely fit the periphery of the printing-cylinder to form a long design, and this construction is indicated in dotted lines in Fig. 8. By this way of arranging the flexible plate upon the periphery of the curved printing member a sheet can be printed of a length substantially equal to the circumference of the printing member. If the cylinder thus prepared is used in connection with a web, the mechanism will allow for the margin between successive imprints.

Electrotype-plates prepared by this method can be very speedily arranged for use and can be most strongly and securely held in place, as practically no extra step has to be taken, the strip simply being inserted while the usual or old methods are being carried out.

I have shown means whereby the plates prepared in this manner can be applied to printing members simply to illustrate the way in which my invention is carried out; but as I do not claim in this case any specific means for clamping the plates in place I do not wish to be limited in any sense to any specific clamping mechanism.

Where I use the term "strip" I mean to use that word in its broadest sense and to include thereby also any other modifications than those herein shown and described.

I have described a steel strip as one that is well adapted for use in my method; but any other strip of any suitable material may be used.

I have described in my method the strip as supported somewhat above the copper plate during the casting operation, so that the backing metal can unite with the entire surface of the copper plate. This is the preferred way of carrying out the method, although it would still be within the scope of my invention to lay the retaining-strip on the copper plate during the casting operation.

The details and arrangements herein described and shown may be varied by a skilled mechanic without departing from the scope of my invention as expressed in the claims.

Having thus fully described my invention, what I claim, and desire to secure by Letters Patent, is—

1. The method of preparing composite electrotype printing-plates, which consists in embodying a straining-strip therein during the process of casting the back on the plates.

2. The method of preparing composite electrotype printing-plates, which consists in making a straining-strip integral with the plate.

3. The method of preparing composite electrotype printing-plates, which consists in casting a separate straining-strip in the backing.

4. The method of preparing composite electrotype printing-plates, which consists in casting a straining-strip in the backing with the edges of the strip projecting beyond the edges of the plate.

5. The method of preparing electrotype-plates which consists in placing in the backing-mold, a straining-strip, and then pouring the backing metal into the mold, so that the backing metal will unite with the electrotype-plate, and so that the straining-strip will be firmly embedded in the complete plate.

6. The method of preparing electrotype-plates which consists in holding a straining-strip slightly above the back of the copper printing-plate in the backing-mold, and then pouring the backing metal into the mold, whereby the backing metal will unite with the entire surface of the printing-plate, and whereby the straining-strip will be firmly embedded in the backing metal.

7. The method of preparing electrotype-plates, which consists in casting a backing metal upon the electrotype shell, and in the casting operation embedding a straining-strip in the backing metal, and then flexing or bending the plate by the straining-strip to fit a curved surface.

8. A printing-plate consisting of an electrotype printing-surface, a backing metal cast upon the same, and a straining or clamping strip embedded in said backing metal.

9. A printing-plate consisting of an electrotype printing-surface, a backing metal cast upon said printing-surface, and a straining-strip embedded in said backing metal, and having holes, so that the backing metal can unite through said strip.

10. A printing-plate consisting of an electrotype printing-surface, a backing metal cast upon the same, and a straining or clamping strip of substantially the same width as the printing-plate embedded therein, and having holes so that the backing metal can unite through the same.

In testimony whereof I have hereunto set my hand in the presence of two subscribing witnesses.

H. A. WISE WOOD.

Witnesses:
  LOUIS W. SOUTHGATE,
  OGDEN BROMER.